United States Patent
Bryar et al.

(10) Patent No.: US 7,801,824 B1
(45) Date of Patent: Sep. 21, 2010

(54) METHOD AND APPARATUS TO FACILITATE ONLINE PURCHASE OF WORKS USING PAID ELECTRONIC PREVIEWS

(75) Inventors: Colin M Bryar, Seattle, WA (US); Udi Manber, Palo Alto, CA (US); Jeffrey P Bezos, Greater Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 1263 days.

(21) Appl. No.: 10/900,035

(22) Filed: Jul. 27, 2004

(51) Int. Cl.
*G06Q 20/00* (2006.01)
(52) U.S. Cl. .............................. 705/65; 705/14; 705/51; 705/75; 707/5; 707/104; 725/136
(58) Field of Classification Search .................... 705/14, 705/52, 51, 65, 75; 707/5, 104; 725/136
See application file for complete search history.

(56) References Cited

U.S. PATENT DOCUMENTS

| | | | |
|---|---|---|---|
| 5,794,210 A | 8/1998 | Goldhaber | |
| 5,907,831 A | * | 5/1999 | Lotvin et al. ................... 705/14 |
| 5,930,777 A | 7/1999 | Barber | |
| 6,058,381 A | 5/2000 | Nelson | |

(Continued)

OTHER PUBLICATIONS

"Book Preview Clubs," Booksamillion.com (BAMM.com), © 1996-2003 Books-A-Million, Inc., and NetCentral, Inc., <http://web.archive.org/web/20031204192932/www.booksamillion.com/ncom/books/help/bookpreview> [retrieved Mar. 12, 2008], 3 pages.

(Continued)

*Primary Examiner*—Pierre Eddy Elisca
*Assistant Examiner*—Shahid Kamal
(74) *Attorney, Agent, or Firm*—Christensen O'Connor Johnson Kindness PLLC

(57) ABSTRACT

A method and system is described to facilitate variable pricing for electronically viewing content online. Consumers pay different amounts to view portions of electronically viewable content obtained from a tangible work, where the amount paid is based on a characteristic of the work (e.g., the genre or publisher), the consumer's past viewing behavior or purchases, including the portions of content (e.g., the number of pages or chapters) previously viewed from the same or other work, or the number or amount of purchases made of other works or products, or the aggregated viewing behavior or purchases of a number of consumers.

72 Claims, 9 Drawing Sheets

U.S. PATENT DOCUMENTS

| | | | |
|---|---|---|---|
| 6,157,917 | A | 12/2000 | Barber |
| 6,195,649 | B1 * | 2/2001 | Gifford ........................ 705/75 |
| 6,349,288 | B1 | 2/2002 | Barber |
| 6,587,837 | B1 | 7/2003 | Spagna et al. |
| 6,633,877 | B1 * | 10/2003 | Saigh et al. ........................ 1/1 |
| 7,162,434 | B1 | 1/2007 | Walker |
| 7,231,597 | B1 * | 6/2007 | Braun et al. ................ 715/201 |
| 7,259,875 | B1 * | 8/2007 | Mazza ...................... 358/1.13 |
| 2002/0002543 | A1 | 1/2002 | Spooren et al. |
| 2002/0161645 | A1 * | 10/2002 | Walker et al. ................. 705/14 |
| 2003/0040957 | A1 * | 2/2003 | Rodriguez et al. ............ 705/14 |
| 2003/0078856 | A1 | 4/2003 | Zubi |
| 2003/0177066 | A1 * | 9/2003 | Zhang et al. .................. 705/14 |
| 2003/0212599 | A1 * | 11/2003 | Kepecs ........................ 705/14 |
| 2003/0216965 | A1 * | 11/2003 | Libman ....................... 705/14 |
| 2004/0025191 | A1 * | 2/2004 | McDermott-Walsh et al. ......................... 725/136 |
| 2006/0089912 | A1 * | 4/2006 | Spagna et al. ................. 705/51 |
| 2007/0073775 | A1 * | 3/2007 | Walker et al. ............ 707/104.1 |
| 2007/0118803 | A1 * | 5/2007 | Walker et al. ............... 715/744 |
| 2008/0243805 | A1 * | 10/2008 | Gutta et al. .................... 707/5 |

OTHER PUBLICATIONS

"Frequently Asked Questions," Booksamillion.com (BAMM.com), © 1996-2003 Books-A-Million, Inc., and NetCentral, Inc., <http://web.archive.org/web/20040103083324/www.booksamillion.com/ncom/books/help/faq> [retrieved Mar. 13, 2008], 5 pages.

Feeney, M.F., "Half-Price Prose On-line Outlets Cut Cost of Bestsellers," The Hartford Courant, Hartford, Conn., May 21, 1999, p. F1.

Laudon, K.C., and C. Guercio Traver, "E-Commerce: Business, Technology, Society, Case Book Update," 2d ed., Addison-Wesley, 2004, Chap. 7, "E-commerce Marketing Concepts," p. 400.

Mace, S., "Taking Software out for a Spin," InfoWorld, InfoWorld Media Group, Jul. 7, 1986, 4 pages.

Swengley, N., "Buy One, Get One Half-Price at the Radical Art Gallery," Evening Standard, London, Sep. 14, 1999, 2 pages.

Drury, T., "Reciprocal Innovation is a Textbook Case," Buffalo Business First, 16(21):5, Feb. 14, 2000.

Cohen, D., "Stephen King Sticks a Knife into Publishers," The Daily Telegraph, London, Oct. 26, 2000, p. 2.

* cited by examiner

METHOD AND APPARATUS TO FACILITATE ONLINE PURCHASE OF WORKS USING PAID ELECTRONIC PREVIEWS

FIELD OF THE INVENTION

The present invention is generally directed to systems and methods for the online purchase of products over a network.

BACKGROUND OF THE INVENTION

The information age has produced an explosion of content for people to read. This content is available in the form of tangible media such as books, magazines, newspapers, newsletters, manuals, guides, references, articles, reports, documents, etc., that exist in print, as well as in the form of electronic media. The Internet has facilitated an even wider publication of content in electronic form through downloading the content in web pages, portable document files, and e-books, among other formats.

The widespread availability of content in electronic form has presented new opportunities for Internet retailers to sell both traditional (i.e., tangible) works and electronic content to consumers. As with any purchase, consumers are unwilling to risk the online purchase of a book or other published work that they may not fully enjoy or that may not otherwise meet their expectations. For works that are purchased online, but do not meet the expectations of the consumer, returning the work is oftentimes a time-consuming process. One way to mitigate the risk that a customer will be unhappy with an online purchase of a work is to allow the consumer to electronically preview sample portions of the digital version of the work, essentially the electronic equivalent of browsing through the pages of a book or other published work in traditional brick-and-mortar stores. By providing limited and free access to digital content, Internet retailers have been able to enhance the online purchase process.

Unfortunately, not all consumers appreciate the value of previewing sample portions of a work before making a purchase. In particular, some consumers are loath to pay for a work when they can view the work for free. They may be tempted to avoid purchasing the work altogether by simply viewing as much of the work as possible electronically and, in some cases, even producing an unauthorized copy of the viewed portions for later consumption. Moreover, like other forms of marketing, allowing viewers to electronically preview works in electronic form costs money. Unless such marketing is shown to increase sales, electronic booksellers may not be able to justify the cost of converting works into an electronic form that may be previewed by consumers.

SUMMARY OF THE INVENTION

To address the above-described issues, a system, method, and computer-accessible medium are provided to facilitate the online purchase of works using electronic previewing. Prior to making a purchase, consumers are allowed to electronically preview content from the electronic form of a work for a variable fee that is dependent on the work being viewed and/or the consumer's prior purchase or previewing activity. Previewing for a fee allows a consumer to minimize their risk when making a purchase, while at the same time recouping some of the bookseller's cost of providing viewable content. Various incentives can be provided to the consumer to make the payment of the fee more attractive to the user. For example, a method is provided in which the consumer earns various incentives such as credits and/or discounts for viewing content from the electronic form of a work. The incentives may subsequently be applied to the further viewing or purchase of the viewed work or other works or products.

In one aspect of the invention, a method is provided in which consumers pay different amounts to view portions of content from the electronic form of a work. The portions of content may be, among others, one or more chapters, sections, pages, paragraphs, or sentences from a work, including sentences or sentence fragments containing or proximate to words that match a search term entered by the consumer. The amount paid may vary based on a variety of factors, for example, the amount paid may be based on the type or identity of the work, such as the genre or publisher of the work. The amount paid may also be based on a single consumer's or on multiple consumers' past viewing behavior or purchases, including the number of pages previously viewed from the same or other electronic work, or the number or amount of purchases made of other works or products, in either tangible or electronic form.

In still another aspect of the invention, a system is provided to facilitate the management of a viewer account database in which each consumer's viewing credits and discounts are maintained. The system includes a user interface to enable consumers to, among other functions, purchase viewing credits, participate in promotional incentives to earn rewards in the form of viewing credits and discounts, and display the status of a personal viewer account. Viewer account balances in the viewer account database are automatically maintained as credits are consumed and purchased or earned.

In accordance with yet other aspects of the present invention, a computer-accessible medium for facilitating the online purchase of works using electronic previewing is provided. The computer-accessible medium comprises data structures and computer executable components comprising a personal viewer system. The data structures define viewer credit, discounts, and account data in a manner that is generally consistent with the above-described method. Likewise, the computer executable components are capable of performing the actions of a personal viewer system generally consistent with the above-described method.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 1:
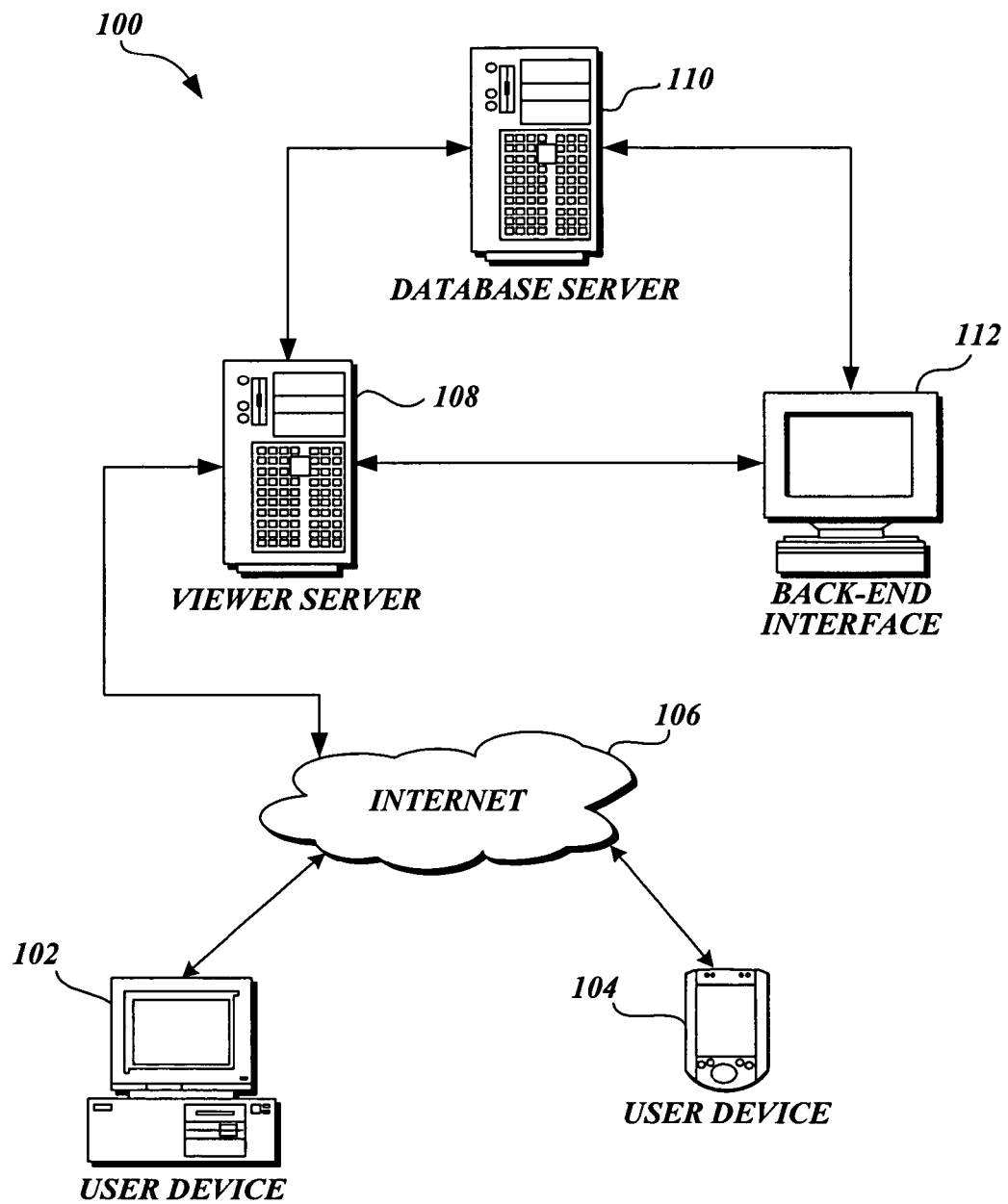
FIG. 1 is a pictorial diagram illustrating an environment for implementing one exemplary embodiment of the invention.

This application is related to U.S. patent application Ser. No. 10/669,088, filed Sep. 23, 2003, entitled "Personalized Searchable Library with Highlighting Capabilities," which is incorporated herein by reference. FIG. 1 illustrates one environment for implementing an embodiment of the present invention. The environment shown includes a personal viewer system 100 with a library of viewable content that a consumer can electronically preview as an aid to decide whether to purchase the complete work from which the viewable content is taken. The environment also includes various electronic user devices, such as a computer system 102 and a PDA 104, which individual users can use to communicate with the personal viewer system 100. In the environment shown in FIG. 1, the user devices 102, 104 communicate with the personal viewer system 100 via one or more computer networks, such as the Internet 106. Protocols and components for communicating via the Internet are well known to those of ordinary skill in the art of computer network communications. Communication between user devices 102, 104 and the personal viewer system 100 may also be enabled by local wired or wireless computer network connections.

The personal viewer system 100 depicted in FIG. 1 operates in a distributed computing environment comprising several computer systems that are interconnected via communication links, e.g., using one or more computer networks or direct connections. However, it will be appreciated by those of ordinary skill in the art that the system 100 could equally operate in a computer system having fewer or greater numbers of components than are illustrated in FIG. 1. Thus, the depiction of the personal viewer system 100 in FIG. 1 should be taken as exemplary, and not limiting to the scope of the claims that follow.

The personal viewer system 100, as illustrated, includes a viewer server 108, a database server 110, and a back-end interface 112. Each of the servers 108 and 110 is described below in more detail. The back-end interface 112 allows an operator of the personal viewer system 100 to monitor and adjust the operation of the servers 108 and 110, as needed.

In brief, the viewer server 108 is generally responsible for providing front-end user communication with various user devices, such as devices 102 and 104, and back-end personal viewer and viewer account services in cooperation with the database server 110. The front-end communication provided by the viewer server 108 may include generating text and/or graphics, possibly organized as a Web page using hypertext transfer protocols, in response to information and viewer requests received from the various user devices 102, 104. The viewer server 108 also is generally responsible for presenting viewable content and viewer account information obtained from the databases in the database server 110. The back-end viewer account services provided by the viewer server 108 may include determining access rights to and charges associated with particular viewable content, incrementing and decrementing viewer accounts as content is viewed, and/or viewing credits as purchased or incurred. The database server 110, as described below in reference to FIG. 2, maintains the databases that the viewer server 108 uses to respond to viewer requests, including a content database 116, an access rights database 120, and a viewer account database 202.

In one suitable implementation, the personal viewer system 100 enables a user to electronically preview selected content from a library of viewable content in the databases stored in the database server 110. The library of viewable content may include various forms of publications, including (but not limited to) books, magazines, newspapers, newsletters, manuals, guides, references, articles, reports, documents, etc. Selection of content to view using the personal viewer system 100 can be accomplished in a variety of ways. For example, a user may manually select content from a general library of content in a manner that positively identifies the content that the user desires to electronically preview with the personal viewer. Automated selection of content to electronically preview based on user actions may also be provided. For example, each time the user selects a particular work for potential purchase, portions of viewable content from the work may automatically be displayed using the personal viewer system 100 so that the user may electronically preview the displayed content. Further details on ways to select content are described in commonly assigned co-pending U.S. patent application Ser. No. 10/669,088, entitled "Personalized Searchable Library with Highlighting Capabilities."

Once selected, images of one or more portions (preferably pages) of the selected content are delivered by the viewer server 108 to the user device 102, 104 for display to the user, e.g., in the form of a Web page, a portable document image, a raster-based image, a vector-based image, etc. Images of content may be stored and delivered in any available image format, including but not limited to .html, .jpg, .gif, .pdf, and/or .tif formats. In an alternate embodiment, non-image based files representing the one or more portions of the selected content are delivered by the viewer server 108 to the user device 102, 104 for display to the user, e.g., in the form of Word document or a text file.

As will be discussed below, a personal viewer enables a user to electronically preview selected content of a work as an aid to determining whether to purchase all of the remaining electronic content or the corresponding tangible work from which the content was obtained. Preferably, the user establishes a personal viewer account prior to viewing content. The viewer account contains a balance of the credits that a viewer purchases and/or earns when using the personal viewer. In other circumstances, a personal viewer account may be established in real time with the submission or execution of the user's request to electronically preview content using the personal viewer system 100. The operation of a personal viewer account in a personal viewer system 100 will be described in more detail below.

Figure 2:
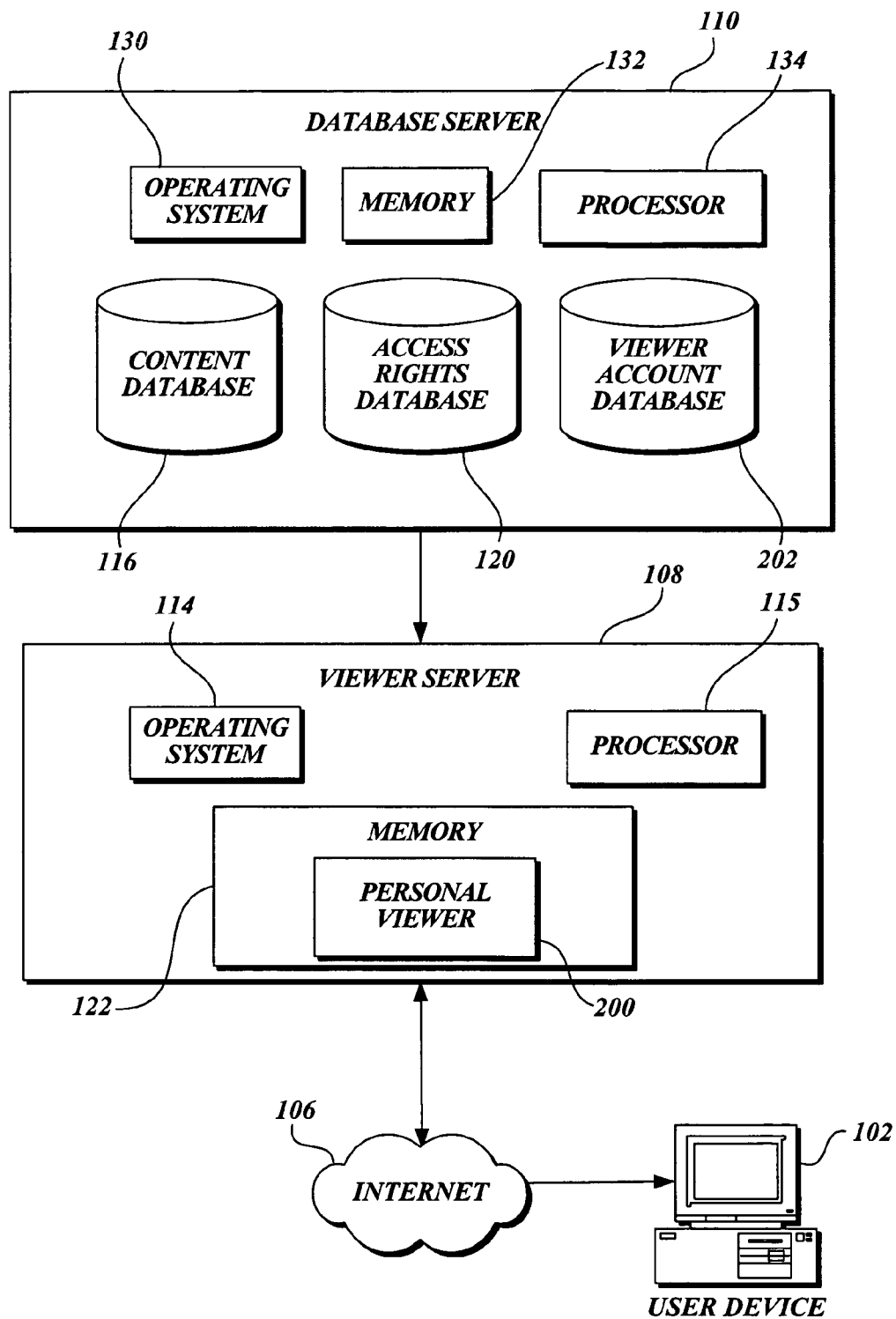
FIG. 2 is a block diagram depicting an arrangement of certain computing components for implementing the embodiment shown in FIG. 1.

FIG. 2 illustrates certain exemplary computing components that are responsible for the operation of the personal viewer system 100 shown in FIG. 1. The viewer server 108, for example, is shown including an operating system 114, processor 115, and memory 122. A personal viewer process 200, stored in the memory 122, is comprised of executable program instructions that operate in cooperation with the database server 110 and the Internet 106 and user device 102, 104 to respond to users' requests to electronically preview content and maintain their personal viewer accounts. The personal viewer process 200 will be described in more detail below. Suitable implementations for the operating system 114, processor 115, and memory 122 are known or commercially available, and are readily implemented by persons having ordinary skill in the art, particularly in light of the disclosure herein.

The database server 110, as illustrated in FIG. 2, includes a content database 116 containing viewable content, an access rights database 120 containing information regarding access rights to the viewable content, and a viewer account database 202 containing viewer account information, including an amount of available credit a viewer has to electronically preview content. The database server 110 includes an operating system 130, a memory 132, and a processor 134 configured to receive user requests to electronically preview content from the content database 116 as relayed from the personal viewer process 200 and viewer server 108. As for the viewer server 108, suitable implementations for the operating system 130, memory 132, and processor 134 are known or commercially available, and are readily implemented by persons having ordinary skill in the art, particularly in light of the disclosure herein.

The database server 110 operates in cooperation with the viewer server 108 to process the requests in accordance with the information in the access rights database 120 and viewer account database 202, and serves the viewable content as appropriate from the content database 116 to the viewer server 108. The viewer server 108, in turn, operates in conjunction with the personal viewer process 200 to display the served viewable content to the user via the Internet 106 on a user device 102, 104.

In one embodiment, the access rights database 120 may contain information about the viewable content that enables the viewer server 108 to administer incentive programs provided by a party, such as an online retailer or online merchant to induce users to electronically preview content with the goal of increasing sales. For example, the access rights database 120 may contain information that reduces or even waives the amount normally charged to view a portion of content from certain works, types of works, and for limited periods of time, e.g., the amount charged to view content from one or more of the top ten bestsellers from the New York Times bestseller list may be discounted for the month of December.

In one embodiment, the viewer account database 202 may contain information about the user that enables the viewer server 108 to further administer incentive programs provided by the party to induce users to electronically preview content with the goal of increasing sales. For example, the viewer account database 202 may contain information about the user's past viewing behavior or purchases that reduces or even waives the amount normally charged to view a portion of content from certain works, types of works, and for limited periods of time, e.g., a user who has purchased Harry Potter books in the past may be eligible to view portions of the newest Harry Potter book at a discount or at no charge for the month of December.

Of course the viewer server 108 may administer other types of incentive programs alone or in conjunction with either or both of the access rights database 120 and viewer account database 202 without departing from the scope of the claims that follow. For example, a party might wish to offer an incentive program that donates the charges that the viewer server 108 assesses to the user's viewer account to a user-designated charity, e.g., an organization that promotes literacy.

In operation, the viewer server 108 controls the charges assessed to the user when content is displayed to the user as a result of a request to electronically preview content from a work available for purchase. For example, a user may request to electronically preview a portion of viewable content from a work, such as selected pages or a chapter of a book, for which the user has made payment arrangements by previously setting up a viewer account in the viewer account database 202. The amount charged to view the portion of viewable content may vary according to the incentive programs that the viewer server 108 is administering, the identity of the user, the type of work from which the content is obtained, the access patterns of an aggregate number of users viewing the content, or other factors as determined from information in the access rights database 120 and/or the viewer account database 202.

Those of ordinary skill in the art will recognize that the viewer server 108 and database server 110 will typically employ a memory and processor in which program instructions are stored and executed for operation of the servers. The viewer server 108 and database server 110 further include executable program instructions for maintaining and updating the databases 116, 120, and 202, and responding to user requests to electronically preview content and maintain their personal viewer accounts. The executable program instructions may be embodied in the personal viewer process 200, shown in the illustrated embodiment as residing on the viewer server 108. Alternatively, the executable program instructions and personal viewer process 200 may be embodied in multiple processes that reside in multiple servers, including both the viewer server 108 and database server 110, or even on the user device 102.

For the sake of convenience, much of the description herein is provided in the context of electronically previewing viewable content from books, but it should be well understood that the description herein is also applicable to electronically previewing other forms of content that can be read and displayed to a user. References herein to specific types of content, such as books, magazines, newspapers, etc., are only illustrative and do not serve to limit the general application of the invention.

As discussed, a user may be permitted to view a portion of viewable content from a work, such as selected pages or a chapter of a book. To enable such viewing, the user must have previously opened a viewer account in the viewer account database 202 (or have such account automatically opened by virtue of an ongoing relationship with the party). In one embodiment, viewer accounts include credits that a user either purchases in advance of making a request to preview content, or earns as part of an incentive program administered by a party to induce users to preview content with the goal of increasing sales of the works from which the content is obtained. The credits may be expended to preview content, the value of which (in the discretion of the party) may be used to obtain discounts on purchases. In one embodiment, the credits may represent actual dollar amounts, such as might be maintained in a credit card account or other form of ledger. Alternatively, the credits may represent a unit value that, in turn, may represent an actual dollar amount. The actual dollar amount represented by the unit value may be fixed or may be variable in accordance with a viewer credit algorithm or payment scheme employed at the party's discretion. Examples of different types of viewer credit algorithms and payment schemes that may be employed by parties to induce users to preview content will be described in further detail with reference to FIG. 4 below.

Figure 3A:
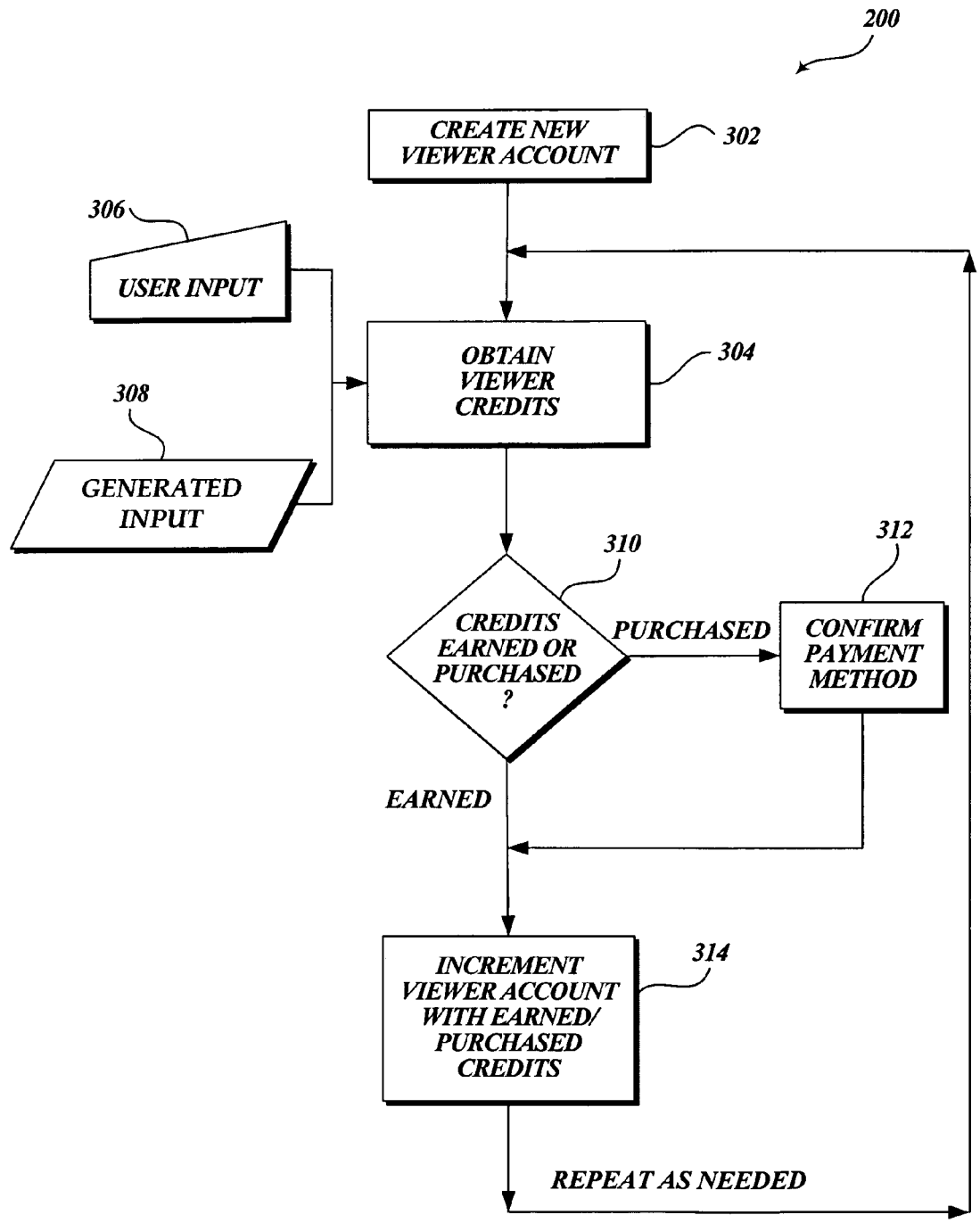
FIG. 3A is a flow diagram describing one embodiment of a process for facilitating the online purchase of works using electronic previewing.

One embodiment of a personal viewer process 200 by which viewer accounts can be maintained in a viewer account database 202 is shown in FIG. 3A. For each user who requests an electronic preview of a paragraph, page, chapter, or other portion of content from the content database 116, the personal viewer process 200 preferably establishes a viewer account 302 against which a particular user's viewing activity is charged. In one embodiment, a user provides a user input 306 to process 304 to manually obtain viewer credits, e.g., by purchasing them. In another embodiment, the personal viewer process 200 may itself generate an input 308 to process 304 to automatically grant viewer credits, for credit to a particular user's viewer account, where the credits are earned as an incentive or reward for participating in promotional incentive programs. For example, the user may agree to electronically preview promotional content from or related to a bestseller to earn a reward in the form of viewing credits that may be applied to discount the charges for future viewing of other requested content from works in which the viewer has an interest. Viewer credits may be generic i.e., applicable against any work in the merchants catalog, or tied to specific categories or products, e.g., a fixed credit may be granted towards a new book produced by a bestselling author if the user had previously purchased the last book by that author.

Once the input 306 and/or 308 is received, the personal viewer process 200 determines whether the obtained viewer credits are earned as a reward or incentive for participating in an incentive program, or purchased. When the viewer credits are purchased, the personal viewer process 200 confirms the payment method at processing block 312. When the viewer credits are earned as part of a reward or incentive for participating in a viewing promotion, the personal viewer process 200 can bypass payment confirmation, as the user has justly earned the credits at no charge. In either case, the personal viewer process 200 continues at processing block 314 to increment the user's viewer account with the earned or purchased credits as indicated.

The personal viewer process 200 repeats the above-described processes as needed, i.e., whenever the user decides to purchase additional viewer credits, or whenever the user participates in promotional programs that entitle him or her to earn viewer credits in exchange for electronically previewing promotional content. Participating in promotional programs generally includes viewing promotional content with the personal viewer, but may also include, for example, other actions, such as making purchases of promotional or other content from the party that is offering the promotion, or visiting Web sites related to the promotion.

Figure 3B:
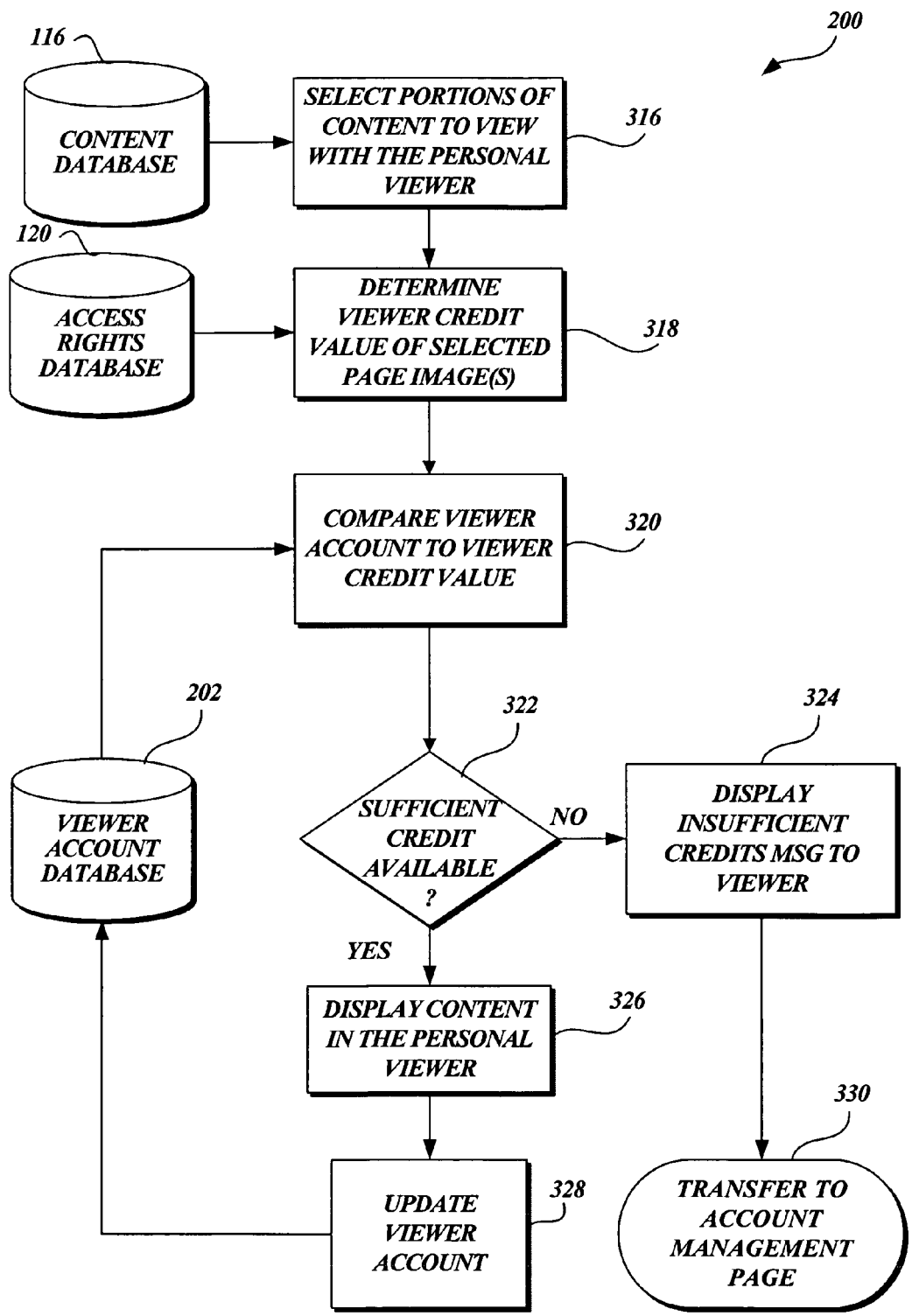
FIG. 3B is a flow diagram describing one embodiment of a process for facilitating the management of a viewer account database.

Further details of one embodiment of a personal viewer process 200 by which viewer accounts can be used to preview page images of content are shown in FIG. 3B. In operation, at process block 316, the personal viewer process 200 facilitates a user selection of a portion of viewable content from a content database 116. It will be appreciated that the selected portion of content may vary from less than one page to several pages comprising one or more chapters.

In one embodiment, at process block 318, the personal viewer process 200 consults an access rights database 120 and/or the viewer's account history as obtained from the viewer account database 202 (should the user have an account), to determine a viewer credit value associated with the selected portion of content. The basis for determining the viewer credit value of the selected portion of content will typically be a unit value that quantifies the selected portion of content, i.e., that indicates the amount of content that the user has selected. For example, the unit value may be a word, a number of words, a phrase, a number of sentences, paragraphs, pages, chapters or other discrete amount of content.

In one embodiment, the viewer credit value corresponds to the amount of the selected portion of content, as indicated by the unit value, as well as the type of work from which the content is obtained. For example, as shown in the graph 400 of a viewer credit algorithm in FIG. 4, when the type of work from which the content is obtained is a work of fiction 410, the viewer credit value of the content 402 will generally increase as the amount of viewed content 404 increases. However, when the type of work from which the content is obtained is a work of nonfiction 406, the viewer credit value of the content 402 decreases as the amount of viewed content 404 increases. Thus, in the illustrated embodiment, the viewer credit value assessed to view pages in a work of nonfiction will decrease over time, whereas the viewer credit value assessed to view pages in a work of fiction will increase over time. In other words, using the payment scheme embodied in the viewer credit algorithm depicted in FIG. 4, users are generally charged a smaller number of credits to view smaller portions of fictional works and a larger number of credits to view larger portions of fictional works, at least up to a certain threshold number of credits (after which the user has likely paid more to view the work than would have been paid to purchase a tangible copy of the work outright). In contrast, the value assessed to view selected portions of content from a reference work 408 may be set to remain the same, regardless of the amount of content viewed, and the value assessed to view selected portions of content from a non-fiction work may decrease, even as the amount of content viewed increases over time.

Figure 4:
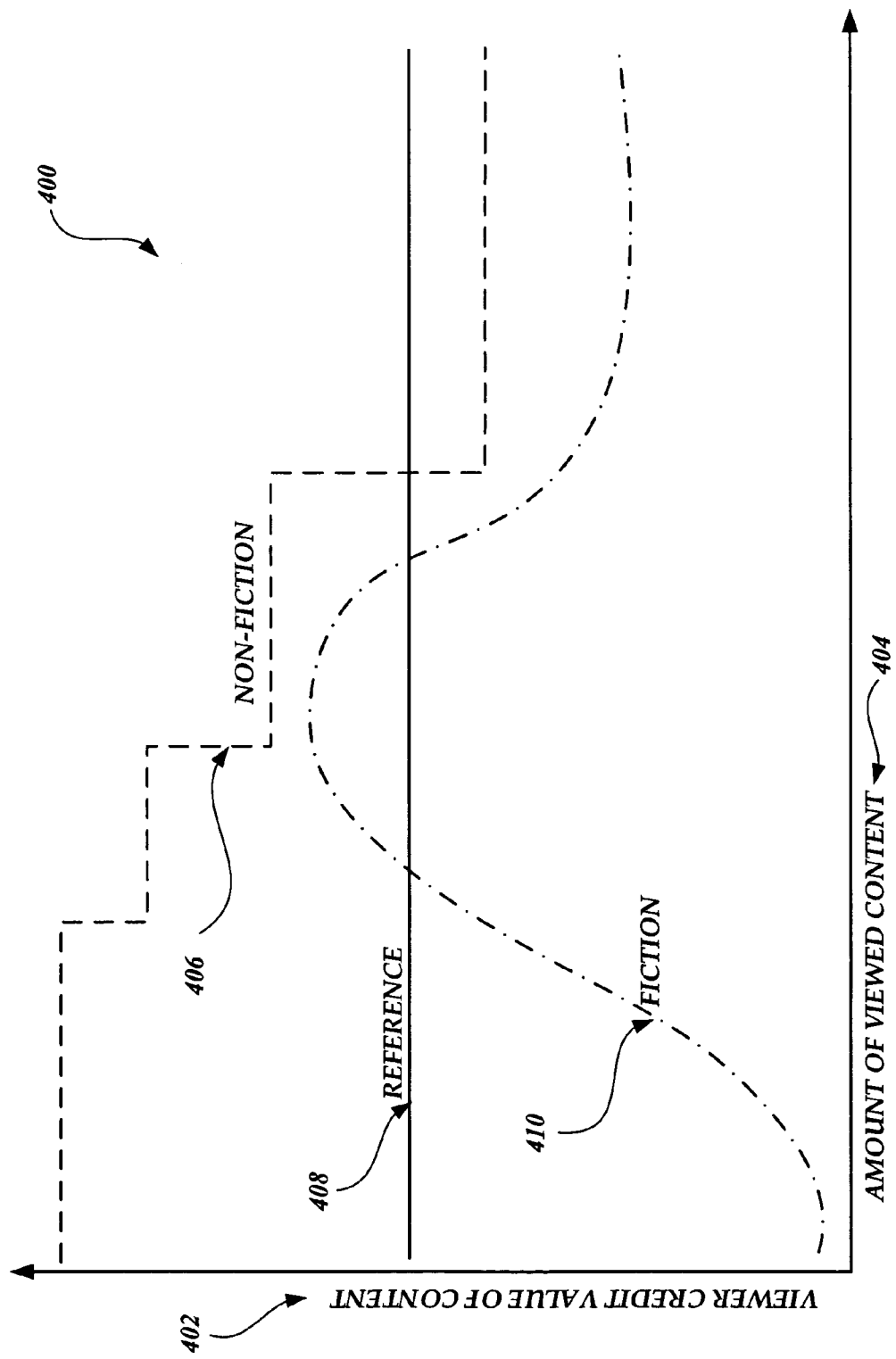
FIG. 4 is a chart that illustrates comparative payment curves for implementing the embodiment shown in FIG. 1 for various types of works.

Returning to FIG. 3B at process block 318, other methods of determining the viewer credit value of a selected portion of content other than the viewer credit algorithm illustrated in FIG. 4 may be employed without departing from the scope of the claims that follow. For example, in one embodiment, in an effort to increase sales of works from a particular publisher, a party may offer a discount or even waive the charges normally assessed to display content from works of that publisher, e.g., a party might offer all users the ability to electronically preview all content from Dutton publishers for free during a particular promotional period. In addition, other viewer credit algorithms may be applied that are specific to a particular user. For example, a party may offer a particular user a discount to electronically preview content from works published by Dutton publishers if the user had previously previewed (and paid for) content from a work published by Dutton. Alternatively, the party may track the user's past purchases of works, and reward the user with a commensurate number of viewer credits or with a fixed number of viewer credits once a threshold dollar amount of purchases has been met. The viewer credits rewarded in this way can be used by the purchaser to discount the charges assessed for future requests to display content. Moreover, the party may provide a discounted rate to electronically preview the content of a new work by a particular author if the user had previously purchased a tangible work by that author.

Still other viewer credit algorithms may be dynamically generated based on the observed viewing behavior of an aggregate number of customers. For example, if it is found that the average viewing of a particular reference work is only three pages, then the number of credits assessed to view the first three pages in the reference work may be correspondingly increased, and the number of credits assessed to view all pages after the first three pages may be decreased to incent the user to continue to preview the work. Various algorithms can be envisioned that would automatically measure access to each work over time and generate an algorithm that is unique to that particular work.

Referring again to FIG. 3B, once the viewer credit value for viewing particular portions of content has been determined, at process block 320 the personal viewer process 200 compares the balance of the user's viewer account as stored in the viewer account database 202 to the value of the pages selected for display. At process block 322, the personal viewer determines whether there is sufficient credit available in the user's account to display the selected pages. If not, the personal viewer displays a message to the user notifying them that there are insufficient credits in their account to view the requested content. In one embodiment, at termination block 330, the personal viewer transfers the user automatically to an account management Web page that enables the user to purchase additional viewer credits if he or she so chooses. Alternatively, the personal viewer may automatically prompt the user to first view a promotional content selection so that the user may earn additional viewer credits. In yet another embodiment, the personal viewer may charge the user to view the content as each piece of content is actually viewed, or may aggregate the cost of all content viewed during a particular session and charge the user in one lump sum at the end of the session.

When the viewer does have sufficient viewer credit in their account, the personal viewer process 200 displays the portion of content representing the requested content in a personal viewer Web page at block 326. As noted earlier, the database server 110 may include an access rights database 120 that is used by the personal viewer process 200 to further control the display of content in response to a user request to view selected content or as part of an incentive program to induce users to view content with the goal of increasing sales of tangible works from which the content is obtained. For example, the access rights database 120 may include access rules that, when determined to be applicable, act to limit the content in the selected portion that is shown to the user when the user's viewing account balance is insufficient to cover the charges assessed to view the content. The rules may further act to limit the content in the selected portion that is shown to the user in conjunction with other types of limitations embodied in the access rights database 120, including limits on the amount (e.g., percentage) of content that can be shown to the user for any given page, title, or collection of content, limits on the total number of pages that can be shown for any given title or collection content, limits on the amount of content based on type of content, limits on the total number of pages that can be shown to a user independent of content-specific limitations, and limits on the total number of pages that can be shown to the user for any given request to electronically preview content. These limits may be imposed on a per request basis or in the aggregate for all of the requests made by the user. These limits may also be imposed for specified time periods. For example, access rules may be written such that a user may not see more than a specified percentage of a given page of content in a specified time frame, such as a 30-day time period or 10 days in a 30-day cycle, or over the lifetime of the user. The personal viewer system 100 may implement user verification procedures to inhibit users from establishing multiple viewer accounts to circumvent access limitations in the access rights database 120.

Access rules in the access rights database 120 may further be configured to apply differently for each individual user (or groups of users), depending on content-specific information, such as the type of content at issue. For example, access rules may be written to permit viewing of tables of content and indexes of content at no charge, but to impose charges when viewing content obtained from the body of the work itself. User location can also act as a factor that determines which access rules govern a user's access to content at the time the content is produced for display to the user. For instance, different access rules may be written to enable a student in a classroom to access an entire body of content that is being used in the class at no charge, while the same student, at home, is only able to view a limited portion of the content at no charge. The domain of computer connection, for example, may be used to determine user location. Access rules may be written to apply differently based on the time the content is to be provided to the user, e.g., on different days or at different times of day, as well. Access rules may also be prepared and stored in the access rights database 120 so that once a portion of content has been displayed to a user, the user can always come back to view that portion, without impacting other limits on viewing other portions of content. A description of the types of access rules that may be employed in an embodiment of the present invention is described in commonly assigned copending U.S. patent application Ser. No. 10/669, 088, filed Sep. 23, 2003, entitled "Personalized Searchable Library with Highlighting Capabilities."

Processing continues at process block 328 to update the viewer account in the viewer account database 202 to reflect the use of the viewer credits. In one embodiment, the personal viewer 200 reduces the user's viewer account by the amount of the viewer credit value associated with the viewed content. Alternatively, or in addition, to induce users to pay for the previewed portions of content (or to eventually purchase the work from which the content was obtained, or to purchase other works or products in which the user is interested), the personal viewer 200 at process block 328 may instead update the viewer account in the viewer account database 202 to, among others, reverse the credit or otherwise refund or reimburse the assessed charges to the user's viewing account under certain conditions, to apply the assessed charges towards other viewing credits already expended, to discount future assessed charges, to apply the assessed charges toward the purchase of the work (or other works or products), or to reward the user with viewer credits for viewing promotional material.

For example, the party may decide to guarantee user satisfaction by offering to waive or reimburse any charges assessed to view the requested content that did not meet the user's expectations. Alternatively, if the user was unhappy with a portion of a work that was viewed, the party may allow the user to apply the credit already expended to view that work to other works offered in the same genre or by the same publisher or author (e.g., if a user was unhappy after previewing one work from a publisher, the user would be allowed to use the same number of credits already expended towards the viewing of another work by that same publisher). Moreover, a user may also be offered discounts to electronically preview other content at a lesser or no charge.

A further incentive to induce users to pay for previewing portions of content would be to allow the user to apply the amount previously paid to preview content towards a subsequent purchase of an electronic or tangible purchase of the previewed work or any other work, e.g., a related work by the same author. For example, a user may have previewed a chapter of the sixth book in The Dark Tower series of books by author Stephen King, for which he or she paid $1.00. The normally discounted purchase price of $18.00 for a hardcover copy of the book, The Song of Susannah, would be further discounted to $17.00 when the user subsequently purchases the book from the party. Alternatively, the user may prefer instead to wait and apply the $1.00 to the purchase price of $23.80 for the seventh book in the Dark Tower series, to be published on Sep. 21, 2004. In another example, the user may have previewed portions of all of the first six books of the Dark Tower series sufficient to earn the $18.00 needed to purchase the hardcover copy of The Song of Susannah outright, in which case the user could apply that amount to the purchase price to, in effect, get the book for free.

In yet another example, the party may decide to allow users to earn viewing credits in exchange for viewing promotional material. For instance, during an election year, a party may promote political humor titles by author Al Franken, such as "Lies and Lying Liars Who Tell Them," or "Still More George W. Bushisms: Neither in French, Nor in English, Nor in Mexican," as further described with reference to FIG. 5. The amount that would normally be assessed against the user's viewer account is instead accumulated as a viewer credit that the user may apply toward future purchases or future previewing of other works in which the user may be interested, such as Bill Clinton's recent memoir entitled "My Life."

Returning now to FIG. 3B, the processing at process block 328 may implement a viewer credit value algorithm such as that illustrated in FIG. 4. For example, at process block 328, the personal viewer 200 may assess users a larger number of viewer credits as they view more content from a particular work of fiction. Conversely, the personal viewer 200 may assess users a smaller number of viewer credits as more content from a work of nonfiction are viewed. Thus users could, in theory, view the entire content of a work online, although the payment scheme would be calibrated such that viewing the entire content from a work is a more expensive option for the user than purchasing a tangible copy of the work outright. The personal viewer 200 may also credit users with viewer credits in the form of a reward for viewing promotional content. Of course, to the personal viewer 200 may implement different viewer credit value algorithms for viewed content without departing from the scope of the claims that follow.

To carry out the above-described viewing limitations, viewer credit algorithms, and incentives, the personal viewer system 100 may be configured to track user activity for each user, including the identity of the portions of content (e.g. the paragraphs, pages, or chapters) that the user has viewed and the time frame in which the user has viewed the content. The tracked user activity may be maintained in memory 122, in the access rights database 120 or in the viewer account database 202, as appropriate.

Figure 5:
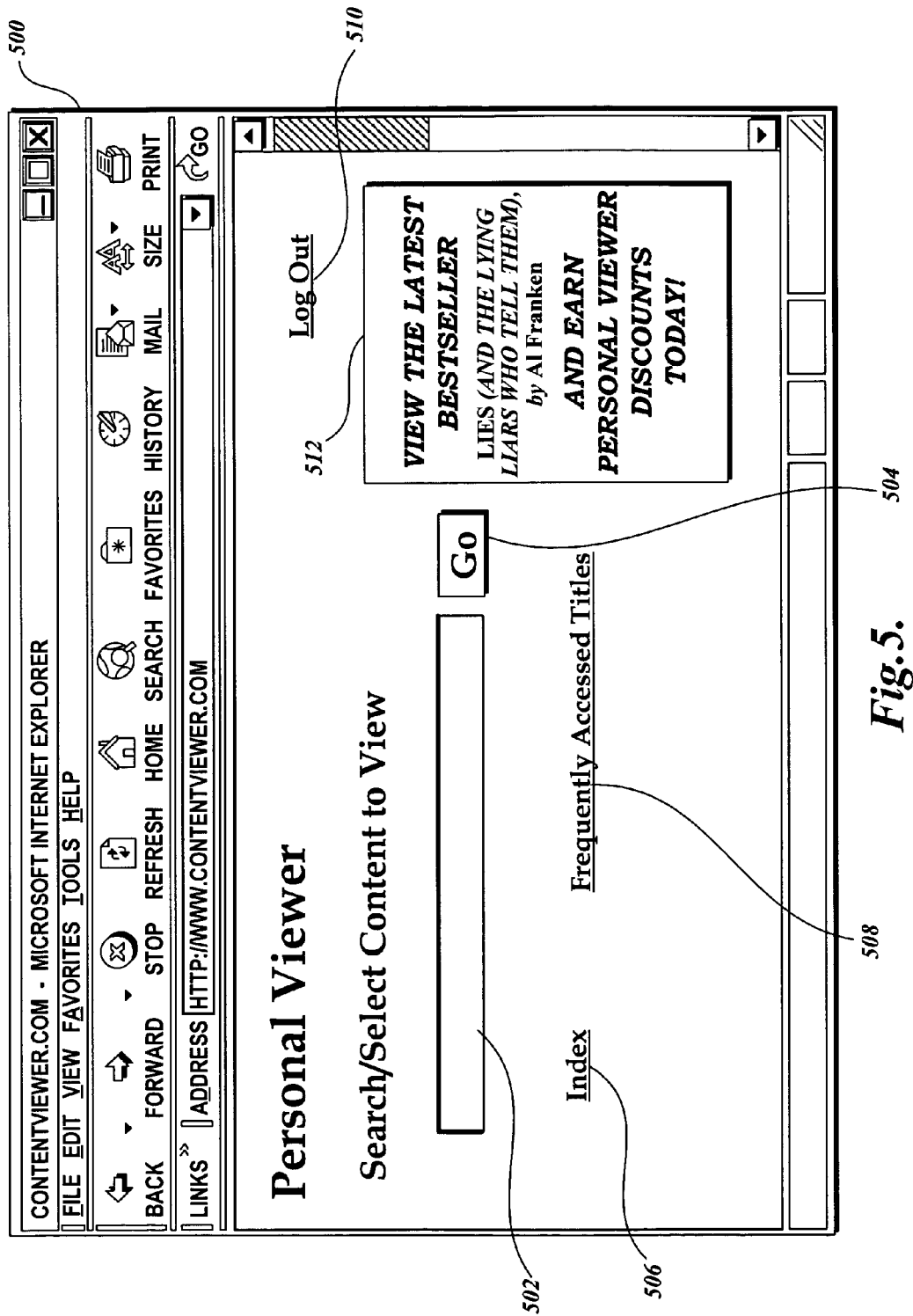
FIG. 5 depicts a browser program with an example Web page formed in accordance with an embodiment of the invention and presenting a personal viewer search input field to a user.

FIGS. 5-8 illustrate a browser program 500 displaying Web pages in which the user is able to use the personal viewer process 200 to view content and maintain their viewer account. The Web pages may be generated by the viewer server 108 and delivered to the user's computing device 102, 104 via the Internet. In FIG. 5, the user enters a desired search term or selection in the box 502 and uses a pointing device, keyboard, or other input device to initiate the request, e.g., by clicking on the button "GO" identified at reference numeral 504. The Web page in FIG. 5 may include other hypertext links, such as an "Index" link 506 and "Frequently Accessed Titles" link 508, both providing additional information that can be assembled into one or more additional Web page(s) not illustrated. Clicking on the Index link 506, for example, may produce a Web page for the user that lists bibliographic data for all of the viewable content available for display. The Frequently Accessed Titles link 508 may produce, for example, a listing of the content most frequently accessed by the user.

Another hypertext link that may be included in the personal viewer is a promotional link 512 that enables the user to view the promoted content and earn personal viewer discounts in the form of earned viewer credits in their viewer account. For example, the illustrated promotional link 512 "View the Latest Bestseller LIES (AND THE LYING LIARS WHO TELL THEM), by Al Franken," when initiated, will take the viewer to another personal viewer Web page, such as that illustrated in FIG. 7, with content displayed from the promoted work. The works that are promoted in the promotional link 512 may be frequently modified in accordance with the party's marketing goals, and may be based on the user's viewing or purchasing history. In other words, the promotional link may list not only bestsellers, but also other titles targeted to the purchasing or viewing habits of the particular user.

Log-in and log-out routines may be employed by the viewer server 108 to provide users with secure access to their viewer accounts. Suitable routines for verifying a user requesting access to viewable content (e.g., using a password) or their viewer account information are well known in the art. In FIGS. 5-8, it is assumed the user has been recognized by the system, and, in certain contexts, may have logged in to verify their identity. A Log Out link 510 is illustrated that, when initiated, enables the user to discontinue the user's current session and log out of his or her account.

Figure 6:
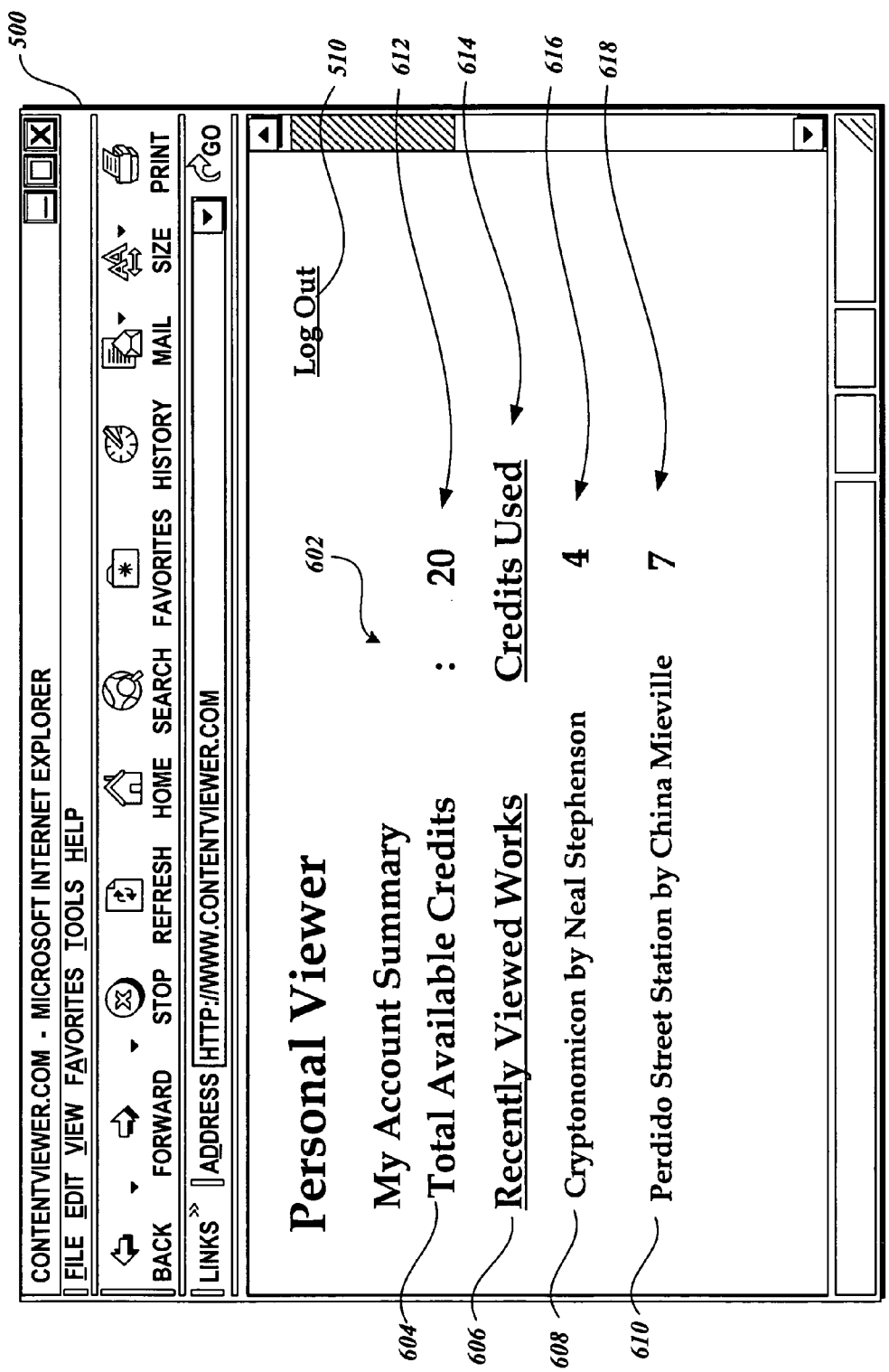
FIG. 6 depicts a browser program with an example Web page formed in accordance with an embodiment of the invention and presenting a personal viewer account summary of works that have been electronically previewed, organized by type of work and publisher.

FIG. 6 illustrates the browser program 500 displaying a Web page in which a user's personal viewer account summary is displayed at reference numeral 602. The viewer account summary 602 may be displayed in a variety of different formats. By way of example only, the viewer account summary 602 in FIG. 6 includes a listing of the total available credits 604 in the viewer's account, in this case 20 credits 612, as well as a listing of the recently viewed works 606 and the number of credits expended to view those works 614. In the illustrated example, the recently viewed works include "Cryptonomicon" by author "Neal Stephenson" for 4 credits 616, and "Perdido Street Station" by author "China Mieville" for 7 credits 618. Other information from the viewer's account may be maintained or displayed in the personal viewer without departing from the scope of the claims that follow.

Figure 7:
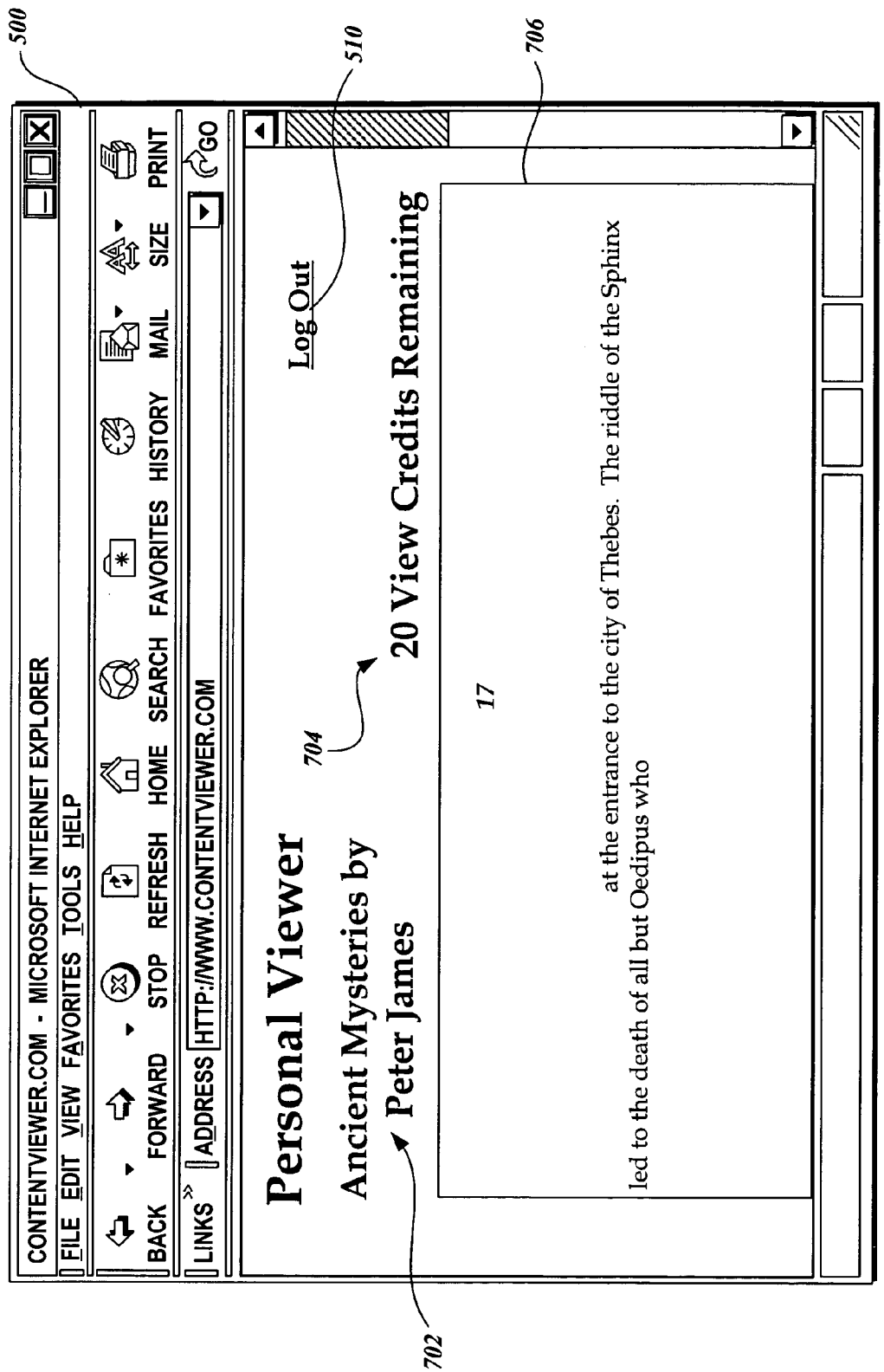
FIG. 7 depicts a browser program with an example Web page formed in accordance with an embodiment of the invention and presenting an image of a page from a sample search as well as personal viewer account information related to that page image.

FIG. 7 illustrates the browser program 500 displaying a Web page in which a portion of the content that the user requested to view (or that the party is promoting) is displayed at reference numeral 706. For example, when the user has requested to view selected content from the book titled "Ancient Mysteries by Peter James," the personal viewer displays the title information at reference numeral 702 along with the available viewer credits remaining to the user at reference numeral 704, which the user may expend when viewing the requested content displayed at reference numeral 706. Of course, other information may be displayed by the personal viewer as well without departing from the scope of the claims that follow, including, for example, the amount of viewer credits that the user has expended by viewing the currently displayed portion of content.

Figure 8:
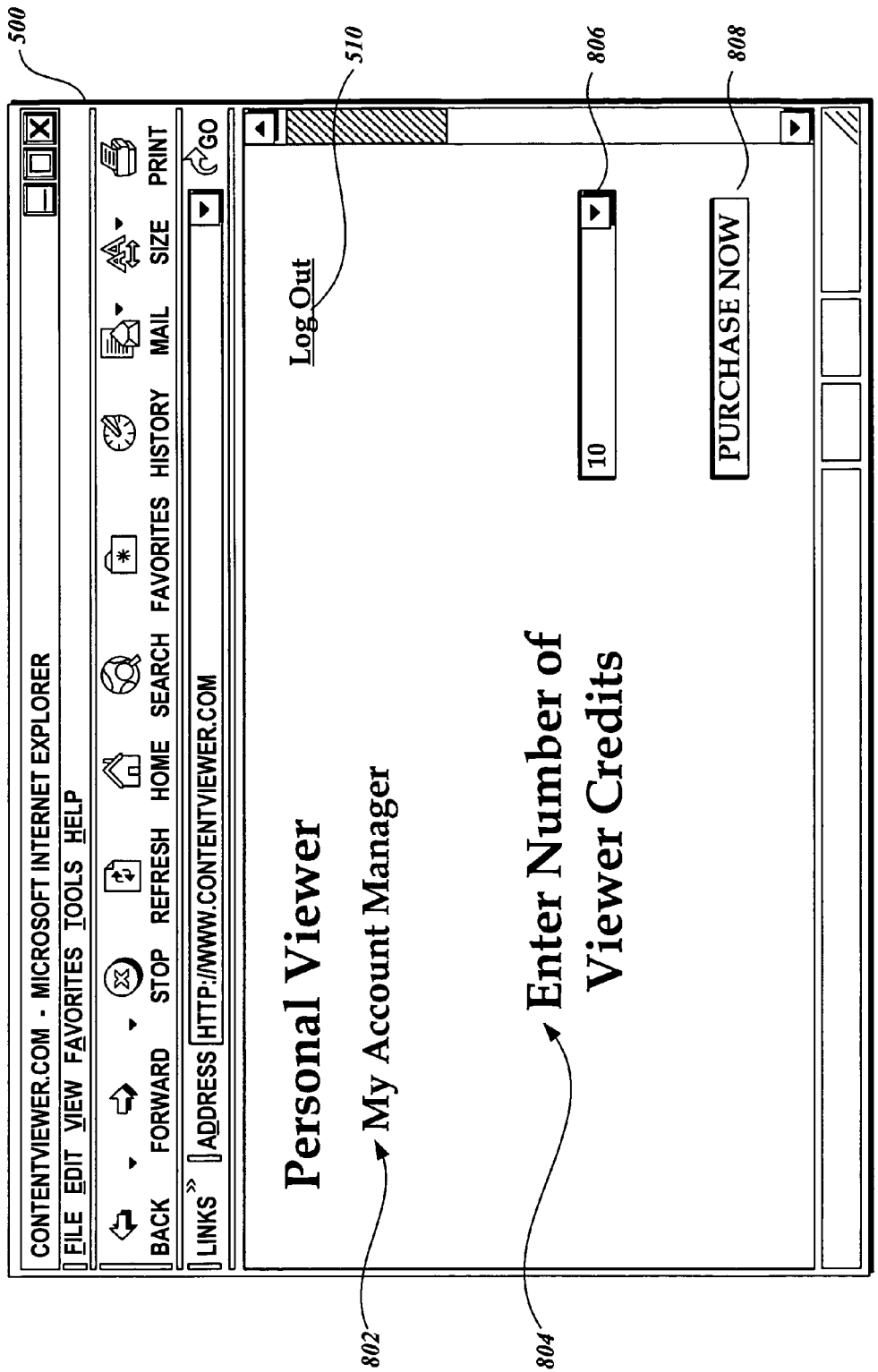
FIG. 8 depicts a browser program with an example Web page formed in accordance with an embodiment of the invention and presenting a personal viewer account management interface to a user.

FIG. 8 illustrates a browser program 500 displaying a Web page for managing a viewer account and, more specifically, a user interface to purchase additional viewer credits. A Web page label identifying the account is illustrated at reference numeral 802, shown here as "My Account Manager." An input box labeled "Enter Number of Viewer Credits," is provided at reference numeral 804, adjacent to an input box at reference numeral 806 in which the user may enter the desired number of viewer credits or select the desired number of viewer credits from a pull-down list of alternatives, e.g., 10, 20, etc. Another input box labeled "PURCHASE NOW" is provided at reference numeral 808, which the user may activate to purchase the selected number of credits. When activated, the "PURCHASE NOW" button causes the user's previously stored payment information (e.g., credit card, debit card, direct withdrawal, etc.) to be charged accordingly. Other interfaces for managing the viewer account may be provided other than that illustrated in FIG. 8, without departing from the scope of the claims that follow. For instance, a Web page showing the amount of viewer credits earned through promotional viewing may be display to the user upon request.

While preferred embodiments of the invention have been illustrated and described above, it will be appreciated that various changes can be made therein without departing from the spirit and scope of the invention. The scope of the present invention should thus be determined from the following claims and equivalents thereto.

The embodiments of the invention in which an exclusive property or privilege is claimed are defined as follows:

1. A computer-implemented method for pricing electronic viewing of works, the method comprising:
    under control of instructions executed by at least one processor of a computer system:
        crediting an account associated with a consumer with viewer credits obtained by the consumer for participating in a promotional incentive program implemented by the computer system;
        receiving a consumer selection of a portion of viewable content in a work from a library comprising a plurality of works for purchase;
    determining a viewer credit value associated with the selected portion of viewable content, wherein the viewer credit value is determined based on an amount of content in the selected portion of viewable content and a type of the work from which the portion of viewable content was selected;
    determining whether the viewer credits in the account associated with the consumer have sufficient value that equals or exceeds the determined viewer credit value;
    when the value of the viewer credits in the account equals or exceeds the determined viewer credit value, delivering the selected portion of viewable content for presentation to the consumer prior to a purchase of the work, by the consumer, from which the portion was selected, wherein the selected portion is delivered in exchange for the determined viewer credit value charged to the account associated with the consumer; and
    notifying the consumer when the account associated with the consumer has viewer credits of a value that is less than the determined viewer credit value.

2. The computer-implemented method of claim 1, wherein the viewer credit value increases when the amount of content delivered for presentation to the consumer increases.

3. The computer-implemented method of claim 1, wherein the viewer credit value decreases when the amount of content delivered for presentation to the consumer increases.

4. The computer-implemented method of claim 1, wherein the viewer credit value is determined according to an aggregated viewing behavior of a plurality of consumers to whom portions of viewable content are delivered.

5. The computer-implemented method of claim 1, wherein the viewer credit value is determined for a particular consumer to whom the portion of viewable content is delivered based on the particular consumer's past viewing behavior.

6. The computer-implemented method of claim 5, wherein the particular consumer's past viewing behavior includes whether the particular consumer has previously viewed other portions of content obtained from the same work.

7. The computer-implemented method of claim 1, wherein the portion of viewable content selected by the consumer is promoted to the consumer by a party selling the work.

8. The computer-implemented method of claim 7, wherein the consumer earns viewer credits for electronically viewing the promoted portion of viewable content.

9. The computer-implemented method of claim 1, further comprising accruing, to the account associated with the consumer, viewer credits per portion of viewable content delivered for presentation to the consumer.

10. The computer-implemented method of claim 1, further comprising transacting a purchase of the work by the consumer.

11. The computer-implemented method of claim 10, wherein the purchased work is in a tangible format.

12. The computer-implemented method of claim 10, wherein the purchased work is in an electronic format.

13. The computer-implemented method of claim 10, further comprising:
    tracking purchases of works by the consumer; and
    crediting the account associated with the consumer with a fixed number of viewing credits when the purchases of works by the consumer exceed a predetermined threshold value.

14. The computer-implemented method of claim 1, wherein the viewer credit value is assessed to the account associated with the consumer in real-time.

15. The computer-implemented method of claim 1, wherein the amount of content in the selected portion of viewable content comprises at least one of a word, a phrase, a sentence, a page, and a chapter.

16. The computer-implemented method of claim 1, wherein delivering the selected portion of viewable content includes delivering the selected portion in an image-based format.

17. The computer-implemented method of claim 16, wherein the image-based format includes at least one of an .html, .jpg, .gif, .pdf, and .tif format.

18. The computer-implemented method of claim 1, wherein delivering the selected portion of viewable content includes delivering the selected portion in a non-image-based format.

19. The computer-implemented method of claim 18, wherein the non-image-based format includes a text-based document.

20. The computer-implemented method of claim 19, wherein the text-based document is a document in an electronically-editable format.

21. A computer-readable storage medium having instructions encoded thereon to facilitate pricing of electronic viewing of works, wherein the instructions, when executed by a computing apparatus, cause the computing apparatus to:
    credit an account associated with a consumer with viewer credits obtained by the consumer for participating in a promotional incentive program;
    receive a consumer-selection of a portion of viewable content in a work from a library comprising a plurality of works for purchase;
    determine a viewer credit value associated with the selected portion of viewable content, wherein the viewer credit value is determined based on an amount of content in the selected portion of viewable content and a type of the work from which the portion of viewable content was selected;
    determine whether the viewer credits in the account associated with the consumer have sufficient value that equals or exceeds the determined viewer credit value;

when the value of viewer credits in the account equals or exceeds the determined viewer credit value, deliver the selected portion of viewable content for presentation to the consumer prior to a purchase of the work from which the portion was selected, wherein the selected portion is delivered in exchange for the determined viewer credit value charged to the account associated with the consumer; and notify the consumer when the account associated with the consumer has viewer credits of a value that is less than the determined viewer credit value.

22. The computer-readable storage medium of claim 21, wherein the viewer credit value increases when the amount of content delivered for presentation to the consumer increases.

23. The computer-readable storage medium of claim 21, wherein the viewer credit value decreases when the amount of content delivered for presentation to the consumer increases.

24. The computer-readable storage medium of claim 21, further comprising an instruction that causes the computing apparatus to aggregate a viewing behavior of a plurality of consumers to whom portions of viewable content are delivered.

25. The computer-readable storage medium of claim 21, wherein the viewer credit value is determined for a particular consumer to whom the units portion of viewable content is delivered based on the particular consumer's past viewing behavior.

26. The computer-readable storage medium of claim 25, wherein the consumer's past viewing behavior includes whether the consumer has previously viewed other portions of viewable content obtained from the same work.

27. The computer-readable storage medium of claim 21, further comprising an instruction that causes the computing apparatus to receive a request from the consumer to view the selected portion of viewable content.

28. The computer-readable storage medium of claim 21, further comprising an instruction that causes the computing apparatus to accrue, to the account associated with the consumer, viewer credits per portion of viewable content delivered for presentation to the consumer.

29. The computer-readable storage medium of claim 21, further comprising an instruction that causes the computing apparatus to assess the viewer credit value to the consumer account.

30. The computer-readable storage medium of claim 21, wherein the amount of content comprises at least one of a word, a sentence, a page, and a chapter.

31. The computer-implemented method of claim 2, wherein the work from which the portion of viewable content is obtained is a work of fiction.

32. The computer-implemented method of claim 2, wherein the work from which the portion of viewable content is obtained is a work of non-fiction.

33. The computer-implemented method of claim 3, wherein the work from which the portion of viewable content is obtained is a work of fiction.

34. The computer-implemented method of claim 3, wherein the work from which the portion of viewable content is obtained is a work of non-fiction.

35. The computer-implemented method of claim 4, wherein the viewer credit value changes when the aggregated viewing behavior of the plurality of consumers indicates that the selected portion of viewable content is in high demand.

36. The computer-implemented method of claim 7, wherein the viewer credit value charged to the consumer account for electronic viewing is waived.

37. The computer-implemented method of claim 8, wherein the earned viewer credits are applicable towards at least one of a future purchase and future electronic viewing.

38. The computer-implemented method of claim 9, wherein the accrued viewer credits are applicable toward a purchase of the work.

39. The computer-readable storage medium of claim 21, wherein the viewer credit value depends on at least one of the work from which the portion was obtained, the selected portion of viewable content, and at least one consumer to whom the portion is delivered.

40. The computer-readable storage medium of claim 22, wherein the work from which the portion of viewable content is obtained is a work of fiction.

41. The computer-readable storage medium of claim 22, wherein the work from which the portion of viewable content is obtained is a work of non-fiction.

42. The computer-readable storage medium of claim 23, wherein the work from which the portion of viewable content is obtained is a work of fiction.

43. The computer-readable storage medium of claim 23, wherein the work from which the portion of viewable content is obtained is a work of non-fiction.

44. The computer-readable storage medium of claim 24, further comprising an instruction that causes the computing apparatus to change the viewer credit value when the aggregated viewing behavior of the plurality of consumers indicates that the selected portion of viewable content is in high demand.

45. The computer-readable storage medium of claim 29, further comprising an instruction that causes the computing apparatus to assess the viewer credit value to the consumer account in real-time.

46. The computer-readable storage medium of claim 28, further comprising an instruction that causes the computing apparatus to apply the accrued viewer credits toward a purchase of the work.

47. A computer system for pricing electronic viewing of works, comprising:

a consumer account component operable on a computer device to credit an account associated with a consumer with viewer credits obtained by the consumer for participating in a promotional incentive program implemented by the computer system;

an identifying component operable on a computer device to receive a consumer selection of a portion of viewable content, wherein the portion is selected from a work in a library comprising a plurality of works for purchase;

a viewer credit value determination component operable on a computer device to determine a viewer credit value associated with the selected portion of viewable content, wherein the viewer credit value is determined based on an amount of content selected by a consumer and a type of the work from which the portion of viewable content was selected;

a comparison component operable on a computer device to determine whether the viewer credits in the account associated with the consumer have sufficient value that equals or exceeds the determined viewer credit value;

a delivery component operable on a computer device, when the comparison component determines that the viewer credits in the account have sufficient value to deliver the selected portion of viewable content for presentation to the consumer prior to a purchase of the work from which the portion was selected by the consumer in exchange for the determined viewer credit value charged to the account associated with the consumer; and a notification component operable on a computer device to notify the consumer when the account associated with the consumer has viewer credits of a value that is less than the determined viewer credit value.

48. The computer system of claim 47, wherein the viewer credit value determination component is further operable to increase the viewer credit value when the amount of content delivered for presentation to the consumer increases.

49. The computer system of claim 48, wherein the work from which the portion of viewable content is obtained is a work of fiction.

50. The computer system of claim 48, wherein the work from which the portion of viewable content is obtained is a work of non-fiction.

51. The computer system of claim 47, wherein the viewer credit value determination component is further operable to decrease the viewer credit value when the amount of content delivered for presentation to the consumer increases.

52. The computer system of claim 51, wherein the work from which the portion of viewable content is obtained is a work of fiction.

53. The computer system of claim 51, wherein the work from which the amount of content is obtained is a work of non-fiction.

54. The computer system of claim 47, wherein the viewer credit value determination component is further operable to determine the viewer credit value according to an aggregated viewing behavior of a plurality of consumers to whom portions of viewable content are delivered.

55. The computer system of claim 54, wherein the viewer credit value determination component is further operable to change the viewer credit value when the aggregated viewing behavior of the plurality of consumers indicates that the selected portion of viewable content is in high demand.

56. The computer system of claim 47, wherein the viewer credit value determination component is further operable to determine the viewer credit value for a particular consumer to whom the portion of viewable content is delivered based on the particular consumer's past viewing behavior.

57. The computer system of claim 56, wherein the particular consumer's past viewing behavior includes whether the particular consumer has previously viewed other portions of content obtained from the same work.

58. The computer system of claim 47, wherein the selected portion of viewable content is promoted to the consumer by a party selling the work.

59. The computer system of claim 58, wherein the viewer credit value determination component is further operable to waive the viewer credit value charged to the account associated with the consumer.

60. The computer system of claim 58, wherein the viewer credit value determination component is further operable to register viewer credits that a consumer earns for electronically viewing the promoted portion of content.

61. The computer system of claim 60, wherein the earned viewer credits are applicable towards at least one of a future purchase and future electronic viewing.

62. The computer system of claim 47, wherein the delivery component is further configured to deliver the selected portion of viewable content upon request by the consumer.

63. The computer system of claim 62, wherein the viewer credit value determination component is further operable to assess the viewer credit value to the account associated with the consumer.

64. The computer system of claim 47, wherein the viewer credit value determination component is further operable to register viewer credits accrued per portion of viewable content delivered for presentation to the consumer.

65. The computer system of claim 64, wherein the viewer credit value determination component is further operable to apply the accrued viewer credits toward a purchase of the work.

66. The computer system of claim 47, further comprising a purchase component operable to facilitate purchasing of the work.

67. The computer system of claim 47, wherein the viewer credit value determination component is further operable to assess the viewer credit value to the account associated with the consumer.

68. The computer system of claim 47, wherein the viewer credit value determination component is further operable to assess the viewer credit value to the consumer in real-time.

69. The computer system of claim 47, wherein the amount of content comprises at least one of a word, a phrase, a sentence, a page, and a chapter.

70. The computer-implemented method of claim 1, wherein said participating in a promotional incentive program includes viewing promotional content.

71. The computer-readable storage medium of claim 21, wherein said participating in a promotional incentive program includes viewing promotional content.

72. The computer system of claim 47, wherein said participating in a promotional incentive program includes viewing promotional content.

* * * * *